United States Patent
Bogdan et al.

(10) Patent No.: US 6,225,759 B1
(45) Date of Patent: *May 1, 2001

(54) METHOD AND APPARATUS FOR CONTROLLING LIGHTS

(75) Inventors: Alexei Bogdan, Bolton; Marc Oliver Hoffknecht, North York, both of (CA)

(73) Assignee: Lumion Corporation, Scarborough (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/265,970

(22) Filed: Mar. 11, 1999

Related U.S. Application Data

(63) Continuation-in-part of application No. 09/009,376, filed on Jan. 20, 1998, now Pat. No. 6,069,457.

(51) Int. Cl.$^7$ ...................................................... G05F 1/00
(52) U.S. Cl. ........................ 315/291; 315/308; 315/339; 315/362; 315/DIG. 4
(58) Field of Search .................................... 315/291, 308, 315/307, 314, 265, 253, 339, 360, 362, DIG. 4; 323/211, 221; 307/140; 340/310.01, 310.04

(56) References Cited

U.S. PATENT DOCUMENTS

| | | | |
|---|---|---|---|
| 3,935,505 | 1/1976 | Spiteri | 315/194 |
| 4,181,873 | 1/1980 | Nuver | 315/291 |
| 4,478,468 | 10/1984 | Schoen et al. | 315/291 |
| 4,859,914 | 8/1989 | Summa | 315/354 |
| 5,055,746 | * 10/1991 | Hu et al. | 315/291 |
| 5,323,088 | * 6/1994 | Cunningham | 315/195 |
| 5,394,064 | 2/1995 | Ranganath et al. | 315/209 |
| 5,396,155 | 3/1995 | Bezdon et al. | 315/291 |
| 5,515,261 | 5/1996 | Bogdan | 363/89 |
| 5,614,811 | 3/1997 | Sagalovich et al. | 323/207 |
| 5,773,939 | 6/1998 | Severson et al. | 318/51 |
| 6,069,457 | * 5/2000 | Bogdan | 315/291 |

FOREIGN PATENT DOCUMENTS

| | | |
|---|---|---|
| 2 197 568 | 5/1988 | (GB) . |
| WO93/17482 | 9/1993 | (WO) . |
| WO 97/06655 | 2/1997 | (WO) . |

* cited by examiner

Primary Examiner—Haissa Philogene
(74) Attorney, Agent, or Firm—Bereskin & Parr

(57) ABSTRACT

A control circuit for controlling the operation of an electrical lighting device, such as a gas discharge ballast or an incandescent lamp, and which can replace a standard switch and requires connection only to the hot wire of an AC power line. The control circuit has a switch encoder which couples two opposite polarity thyristors between the hot wire of an AC power line and the hot wire running through the wall to the fixture. The thyristors are controlled by switches such that the AC waveform is transmitted over the power wires either with the small zero crossing step delays inherent in thyristor switching, or with a chopped waveform such that the transmitted AC waveform has positive going zero crossing step delays or negative going zero crossing step delays. The transmitted AC power waveform is used to power the electrical lighting device as well as to control the operation of the electrical lighting device by connection to a decoder. The decoder decodes the transmitted AC power waveform by generating a voltage pulse waveform having pulse widths corresponding to the duration of the zero crossing step delays, determining the differences in time spans between successive pairs of pulse falling edges and comparing these time differences with a threshold duration. A load controller receives the decoder output and appropriately controls the operation of the electrical lighting device. Since the waveform chopped positive and negative going step delays are generated near the zero crossing of the AC voltage waveform, the transmitted AC power waveform does not generate any substantial signal distortion or cause any significant power factor loss.

28 Claims, 8 Drawing Sheets

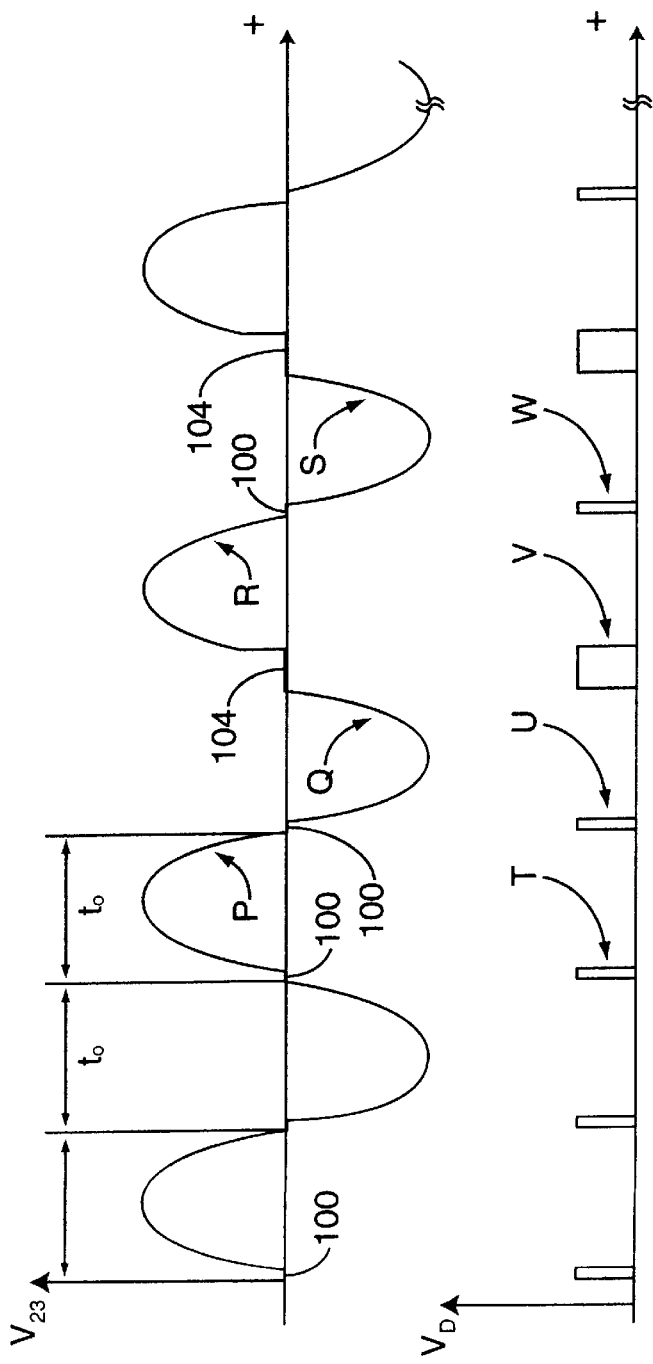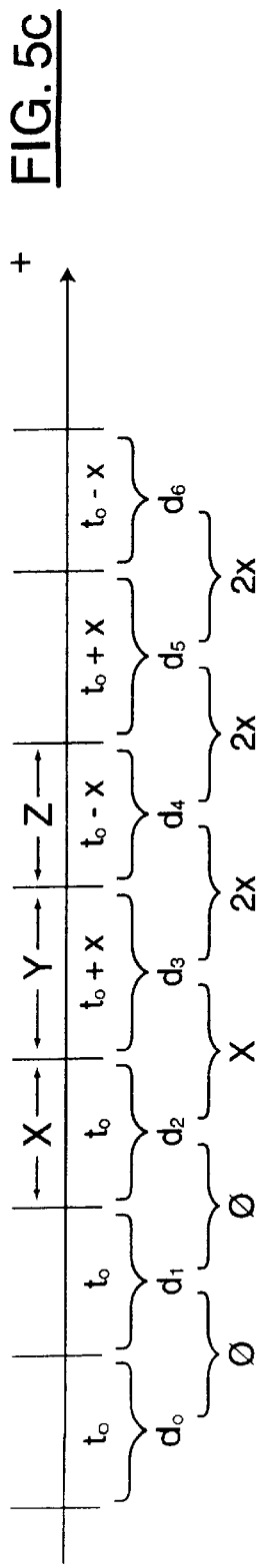

METHOD AND APPARATUS FOR CONTROLLING LIGHTS

This application is a continuation-in-part application of application Ser. No. 09/009,376, filed on Jan. 20, 1998, now U.S. Pat. No. 6,069,457

FIELD OF THE INVENTION

The present invention relates generally to lighting control circuitry, and in particular to a dimmer for use with gas discharge lamp ballasts and incandescent lamps.

BACKGROUND OF THE INVENTION

Dimming circuits for incandescent lamps are well-known and extensively used. However, there are fewer commercially available dimming circuits suitable for use with gas discharge lamps, such as fluorescent lamps. Available gas-discharge lamp dimming circuits contain complex circuitry and a high number of components which makes them expensive to build, install and retrofit to existing ballasts. Consequently, most residential and commercial fluorescent installations do not have dimming capability.

Dimming of fluorescent and other gas discharge lamps is commonly accomplished by a digital dimming circuit located in the ballast and controlled using the "0 to 10V" signalling protocol. This protocol uses a pair of dedicated wires to send a dimming control signal represented by a voltage signal of value between 0 and 10 volts to the ballast dimming circuitry. The ballast dimming circuitry then converts this control signal into a signal adapted to change ballast operating conditions. While this dimming method is popular for dimming fluorescent and other gas discharge lamps, it suffers from several significant disadvantages.

In order to provide dimming for existing lighting installations, the dedicated wires of this signalling system must be installed within ceilings and walls, resulting in significant installation costs. Further, since each ballast requires a separate set of wires, the lighting system is complex to wire and can pose a safety threat if any of the wires are improperly installed (i.e., if the dimming signal wires are mistakenly connected to the main power source, the ballast will short, severely damaging the device and possibly injuring the installer).

Further, signal wires from one ballast must be galvanically isolated from possible interference and noise produced by other ballast signal wires. Such isolation may require the use of additional components which significantly adds to the expense and complexity of a lighting system comprising a number of ballasts. Moreover, since the main power wires are often in close proximity to the signal wires, control signals are still often affected by electrical interference and noise. Corrupted control signals consequently can cause device malfunctions.

A dimming protocol which offers independent fixture addressing is a digital protocol method developed by Tridonic Corporation. This protocol uses signal wires to transmit digital information representing the desired brightness level (i.e., 128 or 256 levels of brightness) and other information such as the particular address of the target ballast to be dimmed. While this method allows for increased unit flexibility and better signal wire economy, the system still requires the use of complex decoders within each ballast and stand alone dimming ballasts which are typically twice as expensive as the existing 0–10 Volt protocol dimming ballasts. In addition, the digital signal sent to the ballasts is susceptible to electrical noise and interference.

Another dimming signalling system is shown in U.S. Pat. No. 4,181,873 to Nuver. U.S. Pat. No. 4,181,873 avoids the need for a separate set of signal leads to a lamp ballast by encoding a high frequency signal (200 kHz to 400 kHz) on an AC line voltage. This signal provides control information which is used to control the gating to a triac for dimming a lamp. However, this dimming protocol is rarely used because such RF communications are very sensitive to the electrical noise commonly found on an AC line. Further, this signalling protocol generates what is known as "RF pollution" which affects radio frequency transmissions and which violates FCC Regulations regarding the maximum level of radio frequency interference that any industrial or commercial electrical device may produce.

Finally, a power line control system is disclosed in U.S. Pat. No. 5,614,811 to Sagalovich. U.S. Pat. No. 5,614,811 discloses encoding voltage pulses within an AC power line voltage at zero crossing points of any one-half AC cycle. The voltage pulses act as control signals for any electrical device which is connected to the AC power line through a receiver/control apparatus. While this control system alleviates some disadvantages associated with RF pollution, the system utilizes relatively complex transmitter and receiver circuits and still creates some RF pollution. Further, this control system cannot be implemented within a European power system as it requires electrical connection to both hot and neutral wires. In Europe, the neutral wire of the AC line is typically provided directly to the lamp or device and is not available for connection to an intermediate control device.

Thus, there is a need for a dimmer circuit for gas discharge lamp ballasts and incandescent or halogen lamps, which can be implemented in a cost-effective manner and which facilitates easy and safe installation, which is not susceptible to electrical interference or corruption, which meets established FCC radio interference noise regulations, which can be easily retrofitted to operate within any dimming ballast, and which can be used in association with European power systems.

BRIEF SUMMARY OF THE INVENTION

It is therefore an object of the present invention to provide a dimmer circuit for controlling an electrical lighting device having a load input, said dimmer circuit including:

(a) a power input terminal coupled to a first wire of an AC power line, said AC power line generating an input AC waveform across said first wire and a second wire, said input AC waveform having a selected waveform energy, (b) an encoding circuit coupled to said input terminal for selectively wave chopping the half cycles of said input AC waveform in the vicinity of the zero crossings of input AC waveform to generate a plurality of output waveforms across an output terminal and said second wire, said output waveforms including said input AC waveform having at least some half cycle zero crossing step delays, each output waveform having a waveform energy substantially the same as said selected waveform energy, (c) a controller coupled to said encoding circuit and operative to cause said encoding circuit to produce across said output terminal and said second wire a selected one of said output waveforms, (d) said load input being adapted to be coupled to said output terminal and to said second wire for receiving said selected output waveform so that said selected output waveform provides operational power to said electrical lighting device, and (e) a decoder adapted to be coupled to said output terminal and to said second wire and to said electrical lighting device and responsive to the selected output waveform from said encoding circuit for controlling said electrical lighting device.

In a second aspect, the present invention provides a method of controlling an electrical lighting device at a first location connected to an AC power line at a second location, said AC power line having first and second wires and providing an AC waveform across said first and second wires, said AC waveform having a selected waveform energy, said method including the steps of:

(a) selectively wave chopping the half cycles of said input AC waveform in the vicinity of the zero crossings of input AC waveform, to generate a plurality of output waveforms across an output terminal and said second wire, said output waveforms including said AC waveform having at least some half cycle zero crossing step delays, (b) selectively transmitting one of said output waveforms from said second location across said first and second wires to said electrical load, to provide operational power to said load, (c) decoding said power waveforms at said first location, and controlling said electrical lighting device in accordance therewith.

Further objects and advantages of the invention will appear from the following description, taken together with the accompanying drawings.

BRIEF DESCRIPTION OF THE DRAWINGS

In the accompanying drawings:

FIG. 5a is a waveform diagram of an encoded voltage waveform $V_{23}$ generated at the output terminals $AC_2$ and $AC_3$ of the switch encoder of FIG. 2 before and after switch $SW_1$ of FIG. 2 is depressed;

FIG. 5b is a waveform diagram of the voltage pulse waveform VD which is generated by the decoder circuit of FIG. 4 at node D in response to the encoded voltage waveform $V_{23}$ of FIG. 5a;

FIG. 5c is a timing diagram showing instances of the falling edge of the voltage pulse waveform $V_D$ of FIG. 5b;

DETAILED DESCRIPTION OF PREFERRED EMBODIMENTS

The present invention is a further variation on the general technique of simultaneously controlling and powering electrical devices including electrical lighting devices as discussed in U.S. Pat. No. 5,614,811 entitled "Power Line Control System" and which issued Mar. 25, 1997 naming Alex Bogdan as an inventor, and in co-pending U.S. patent application Ser. No. 09/009,376 filed Jan. 20, 1998, which is the patent application of the present continuation application. The description and drawings of the said prior patent and application are hereby incorporated by reference into this application in their entirety.

Figure 1:
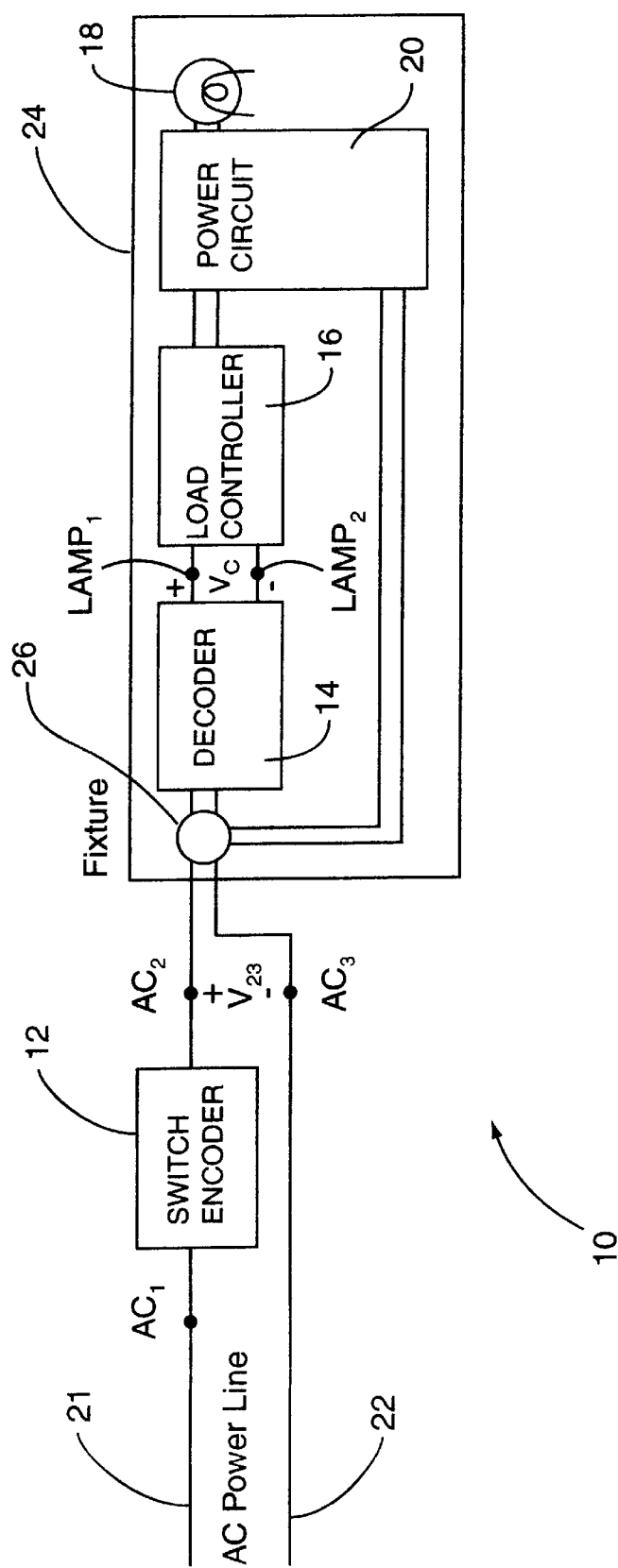
FIG. 1 is a block diagram view of a lamp with a universal dimmer connected thereto, according an embodiment of the present invention.

Reference is first made to FIG. 1, which shows a universal dimmer 10 according to a preferred embodiment of the invention. Dimmer 10 uses a switch encoder 12, a decoder 14 and a load controller 16 to dim a lamp 18 (either incandescent or gas discharge) by appropriately controlling the operation of a power circuit 20 associated with lamp 18.

Figure 2:
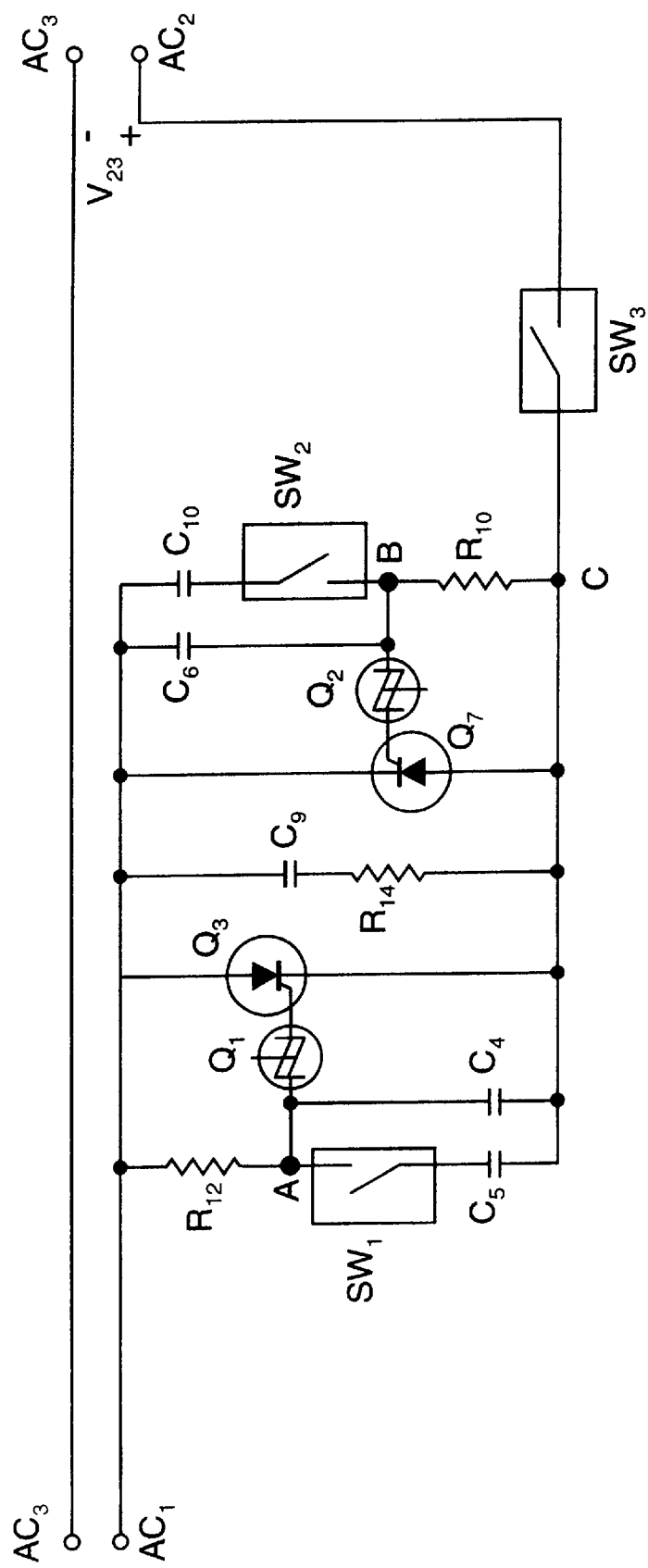
FIG. 2 is a schematic diagram of a switch encoder according to the present invention.

Switch encoder 12 is connected to the hot wire 21 of an AC power line at terminal $AC_1$. The AC power line is typically a 120 Volt 60 Hz power line from a distribution panel, although any world-wide AC line standard voltage can be accommodated. In particular, it should be noted that dimmer 10 is compatible with the standard electrical power system used in many European countries, as switch encoder 12 only requires electrical connection with hot wire 21. Switch encoder 12 is typically mounted in a conventional wall switch box and is attached to existing wiring. Switch encoder 12 includes three manual or electronic switches, namely dimming switches $SW_1$ and $SW_2$ and an on/off switch $SW_3$ (FIG. 2). When one dimming switch $SW_1$ or $SW_2$ is "closed" (or depressed) and on/off switch $SW_3$ is closed, a distinct voltage waveform $V_{23}$ is produced across the output terminal $AC_2$ of switch encoder 12 and the terminal $AC_3$ of neutral wire 22 of the AC power line.

Decoder 14 is installed within a typical lighting fixture 24 (FIG. 1). Fixture 24 contains a power terminal 26 which is coupled to the output terminal $AC_2$ of switch encoder 12 and to terminal $AC_3$ of neutral wire 22 of the AC power line. If dimmer 10 is used in association with a lamp that utilizes a ballast, then decoder 14 may be specifically integrated within power circuit 20 (i.e. integrated within a dimming ballast) in fixture 24. For application to an incandescent or halogen lamp, decoder 14 can be simply installed at a convenient location within fixture 24. The voltage waveform $V_{23}$ produced by switch encoder 12 across terminals $AC_2$ and $AC_3$ is received by decoder 14 which in turn generates an appropriate control voltage $V_c$ across terminals $LAMP_1$ and $LAMP_2$ for input into load controller 16.

Load controller 16 is used to control the operation of a typical power circuit 20 for lamp 18, in accordance with the voltage waveform $V_{23}$ across terminals $AC_2$ and $AC_3$. Load controller 16 can be used to adapt dimmer 10 for use with a gas discharge lamp, such as fluorescent, high intensity discharge and others associated with any type of power circuit 20 such as a conventional non-dimming ballast. Alternatively, load controller 16 can adapt dimmer 10 for use with a non-ballast lamp 18 such as an incandescent or halogen lamp which uses a power circuit 20 which would otherwise connect lamp 18 across hot and neutral wires 21 and 22 of the AC power line. Accordingly, power circuit 20 is connected both to load controller 16 and to power terminal 26 (through one or two wires, depending on the type of lamp), to provide operational power and dimming functionality to lamp 18.

FIG. 2, which shows an electrical schematic of switch encoder 12, will now be discussed in more detail. As shown, switch encoder 12 includes dimming switches $SW_1$, $SW_2$ and on/off switch $SW_3$, thyristors $Q_3$ and $Q_7$, bilateral switches $Q_1$ and $Q_2$, capacitors $C_4$, $C_5$, $C_6$, $C_9$, $C_{10}$, and resistors $R_{10}$, $R_{12}$ and $R_{14}$. Switch encoder 12 generates five different voltage waveforms across terminals $AC_2$ and terminal $AC_3$. Specifically, switch $SW_3$ operates as an on/off switch such that when switch $SW_3$ is "open" (or non-depressed), no voltage is provided across terminals $AC_2$ and $AC_3$. The other four voltage waveforms correspond to the four possible configurations of switches $SW_1$ and $SW_2$ when switch $SW_3$ is "closed" (or depressed), as will be explained. The inventors have found that the following component values provide desirable operation of switch encoder 12.

| Designation | Description (or Part No.) | Designation | Description (or Part No.) |
|---|---|---|---|
| $Q_3$ and $Q_7$ | BTS152 | $C_9$ | 100 nF |
| $Q_1$ and $Q_2$ | MBS4991 | $C_{10}$ | 4700 pF |
| $C_4$ | 4700 pF | $R_{10}$ | 33 k$\Omega$ |
| $C_5$ | 4700 pF | $R_{12}$ | 33 k$\Omega$ |
| $C_6$ | 4700 pF | $R_{14}$ | 10 k$\Omega$ |

Thyristors $Q_3$ and $Q_7$ are conventional and conduct when triggered through bilateral switches $Q_1$ and $Q_2$, respectively. Bilateral switches $Q_1$ and $Q_2$ are conventional silicon bilateral switches which conduct when their breakdown voltage has been exceeded. Thyristor $Q_3$ is forward connected across terminals $AC_1$ and $AC_2$ and thyristor $Q_7$ is reverse connected across terminals $AC_1$ and $AC_2$. It should be understood that when thyristors $Q_3$ and $Q_7$ are operating in a blocking state (i.e. during zero crossings), the impedance of switch encoder 12 is substantially higher than the impedance of the load (i.e. power circuit 20 connected with lamp 18).

Capacitor $C_4$ and resistor $R_{12}$ are series connected and are together coupled across the cathode and anode of thyristor $Q_3$. The center point of the capacitor $C_4$ and resistor $R_{12}$ branch is coupled at node A to the gate of thyristor $Q_3$ through bilateral switch $Q_1$. Correspondingly, capacitor $C_6$ and resistor $R_{10}$ are series connected and together are coupled across the cathode and anode of thyristor $Q_7$ with their center point at node B coupled to the gate of thyristor $Q_7$ through bilateral switch $Q_2$.

Switch $SW_3$ operates as the main on/off switch for lamp 18, such that when switch $SW_3$ is closed (or depressed), the AC voltage waveform across terminal $AC_3$ and node C is applied to lamp 18 and when switch $SW_3$ is open (or non-depressed), lamp 18 is disconnected from AC power line. Most of the description of the operation of dimmer 10 which follows will assume that switch $SW_3$ is closed (or depressed). Switch $SW_1$, when closed (or depressed) connects capacitor $C_5$ in parallel with capacitor $C_4$. Switch $SW_2$, when closed (or depressed) connects capacitor $C_{10}$ in parallel with capacitor $C_6$. Finally, capacitor $C_9$ and resistor $R_{14}$ form a snubber network which serves to protect thyristors $Q_3$ and $Q_7$, as is conventionally known.

When both switches $SW_1$ and $SW_2$ are open (or non-depressed) and switch $SW_3$ is closed (or depressed), the voltage waveform $V_{23}$ (FIG. 3a) generated across terminals $AC_2$ and $AC_3$ exhibits a very slight zero crossing step characteristic (i.e. as results from waveform chopping) due to the standard turn-on characteristics of bilateral switches $Q_1$ and $Q_2$, as is conventionally known. Until the voltage at node A exceeds its breakthrough voltage, bilateral switch $Q_1$ will exhibit high forward and reverse resistance and thyristor $Q_3$ will be in a blocking state (i.e. non-conducting). Similarly, until the voltage at node B exceeds its breakthrough voltage, bilateral switch $Q_2$ will exhibit high forward and reverse resistance and thyristor $Q_7$ will be in a blocking state.

In particular, when a positive AC voltage waveform (rising from zero) is applied across terminals $AC_1$ and $AC_3$, capacitor $C_4$ will begin charging up until the voltage at node A reaches the breakthrough threshold voltage of bilateral switch $Q_1$ (e.g. 8 volts). Once this breakthrough threshold voltage is reached, bilateral switch $Q_1$ will conduct and the charge of capacitor $C_4$ will be transferred onto the gate of thyristor $Q_3$, turning thyristor $Q_3$ on. This causes a small zero crossing delay 100, followed by an abrupt increase in the voltage waveform $V_{23}$ or a small "step" 102 at the point where the breakover threshold voltage is met. It should be noted that the duration of small zero crossing step delay 100 of voltage waveform $V_{23}$ in FIG. 3a has been somewhat exaggerated for illustrative purposes. The inventors have determined that when the exemplary circuit values of switch encoder 12 listed above are employed, the duration of small zero crossing step delay 100 has a phase angle of less than 1 degree.

Once thyristor $Q_3$ conducts, switch encoder 12 will enter into a low impedance state and the voltage waveform $V_{23}$ generated across terminals $AC_2$ and $AC_3$ will mirror the AC voltage waveform provided by the AC power line across terminals $AC_1$ and $AC_3$ for the rest of the positive cycle of the AC waveform. When the AC voltage waveform provided across terminals $AC_1$ and $AC_3$ falls back towards its negative cycle, the current passing through thyristor $Q_3$ will drop below the thyristor holding current and thyristor $Q_3$ will enter into a blocking state again.

Figure 3A:
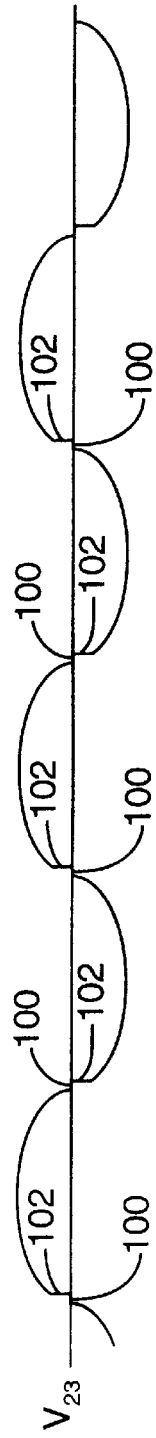
FIG. 3a is a waveform diagram of an encoded voltage waveform $V_{23}$ generated across the output terminals $AC_2$ and $AC_3$ of the switch encoder of FIG. 2 when switch $SW_3$ is depressed and neither switch $SW_1$ nor $SW_2$ of FIG. 2 is depressed.

An analogous waveform characteristic will be produced for the subsequent negative voltage cycle due to the corresponding operation and polarity of bilateral switch $Q_2$ and thyristor $Q_7$ and the corresponding configuration of switch $SW_2$, capacitors $C_6$ and $C_{10}$ and resistor $R_{10}$. Accordingly, the resulting voltage waveform $V_{23}$ generated across terminals $AC_2$ and $AC_3$ will be generated as shown in FIG. 3a. It should be noted that the small zero crossing delay 100 has an insignificant effect on the character of the AC voltage waveform provided by the AC power line due to its short duration and the fact that very low energy characteristics are associated with an AC voltage waveform close to its zero crossing.

Figure 3B:
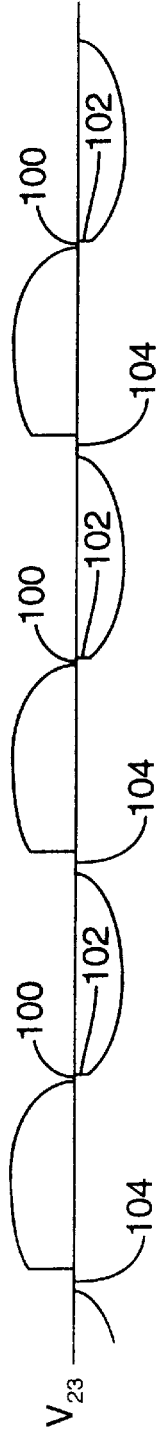
FIG. 3b is a waveform diagram of an encoded voltage waveform $V_{23}$ generated across the output terminals $AC_2$ and $AC_3$ of the switch encoder of FIG. 2 when switches $SW_1$ and $SW_3$ of FIG. 2 are depressed.

When switch $SW_1$ is closed (or depressed) and $SW_2$ is open (or non-depressed) and on/off switch $SW_3$ is closed (or depressed), the voltage waveform $V_{23}$ generated across terminals $AC_2$ and $AC_3$ will exhibit a more pronounced zero crossing step during its positive cycle (FIG. 3b). When switch $SW_1$ is closed, capacitor $C_5$ will be connected in parallel with capacitor $C_4$ which will increase the time that it takes bilateral switch $Q_1$ to turn on. The increase in effective capacitance due to the parallel connection of capacitors $C_5$ and $C_4$ will result in a longer turn-on time for bilateral switch $Q_1$ which then turns thyristor $Q_3$ on. Thus, a more pronounced thyristor-switched positive going zero crossing step delay 104 will result, as shown in FIG. 3b. The duration of positive going zero crossing step delay 104 of voltage waveform $V_{23}$ in FIG. 3b has been somewhat exaggerated for illustrative purposes. It should be noted that the values of capacitors $C_4$, $C_5$ and resistor $R_{12}$ are chosen such that the duration of this positive going zero crossing step delay 104 is less than 1/20 of a half cycle period of the voltage waveform generated by the AC power line or so that the phase angle occupied by delay 104 is less than 9 degrees.

Figure 3C:
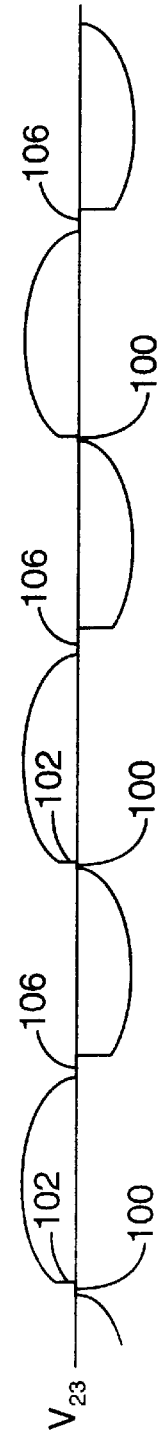
FIG. 3c is a waveform diagram of an encoded voltage waveform $V_{23}$ generated across the output terminals $AC_2$ and $AC_3$ of the switch encoder of FIG. 2 when switches $SW_2$ and $SW_3$ of FIG. 2 are depressed.

When switch $SW_1$ is open (or non-depressed), $SW_2$ is closed (or depressed) and on/off switch $SW_3$ is closed, the voltage waveform $V_{23}$ generated across terminals $AC_2$ and $AC_3$ will exhibit a more pronounced negative going zero crossing step delay 106 during the negative cycle. When switch $SW_2$ is closed, capacitor $C_{10}$ will be connected in parallel with capacitor $C_6$ which will increase the time that it takes bilateral switch $Q_2$ to turn on. The increase in effective capacitance due to the parallel connection of capacitors $C_{10}$ and $C_6$ will result in a longer turn-on time for bilateral switch $Q_2$ which then turns thyristor $Q_7$ on. Thus, a more pronounced thyristor-switched negative going zero crossing step delay 106 will result. The resulting voltage $V_{23}$ is shown in FIG. 3c. The duration of negative going zero crossing step delay 106 of voltage waveform $V_{23}$ in FIG. 3c has been somewhat exaggerated for illustrative purposes. It should be noted that the values of capacitors $C_6$, $C_{10}$ and resistors $R_{10}$ are chosen such that the duration of the negative going zero crossing step delay 106 is less than 1/20 of a half cycle period of the voltage waveform generated by the AC power line or so that the phase angle of delay 106 is less than 9 degrees.

The inventors have determined that the exemplary component values listed for switch encoder 12 generate positive and negative going zero cross step delays 104 and 106, such that each delay has a duration of approximately 7 degrees. However, with suitable component values, the inventors have determined that the positive and negative going zero cross step delays 104 and 106 can have a much lower phase delay (eg. 0.5 degrees) and still be suitable for encoding information, as long as the duration of the small zero crossing step delay 100 has a sufficiently short duration so as to be distinguishable from the positive and negative going zero cross step delays 104 and 106.

Figure 3D:
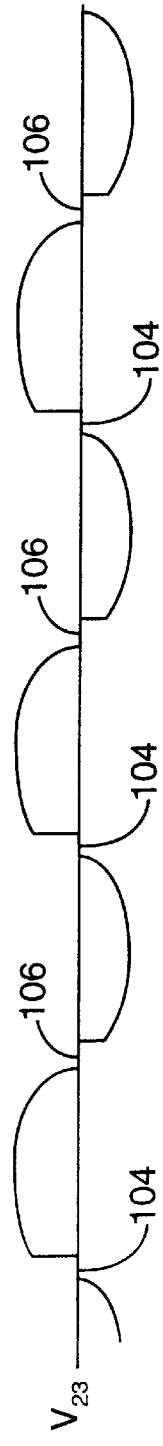
FIG. 3d is a waveform diagram of an encoded voltage waveform $V_{23}$ generated across the output terminals $AC_2$ and $AC_3$ of the switch encoder of FIG. 2 when switches $SW_1$ and $SW_2$ and $SW_3$ of FIG. 2 are depressed.

When both switches $SW_1$ and $SW_2$ are closed (or depressed), and on/off switch $SW_3$ is closed, the voltage waveform $V_{23}$ generated across terminals $AC_2$ and $AC_3$ will exhibit pronounced positive and negative going zero crossing step delays 104, 106. This occurs due to the combined action of both thyristor circuits described above. The duration of the zero crossing step delays 104, 106 are together less than 1/20 of the full period of the AC voltage waveform generated by the AC power line. The resulting voltage waveform $V_{23}$ is shown in FIG. 3d. It should be noted that while this waveform is not utilized by decoder 14 to change lamp running conditions (as will be described), it should be understood that it would be possible to utilize this signal to provide additional functionality such as by turning lamp 18 on and off (instead of using on/off switch $SW_3$).

Once switches $SW_1$ and $SW_2$ are returned to their normal non-depressed positions and on/off switch $SW_3$ is closed, the AC voltage waveform $V_{23}$ of FIG. 3a is again provided across terminals $AC_2$ and $AC_3$. In this way, switch encoder 12 produces different AC voltage waveforms $V_{23}$ (corresponding to configurations of switches $SW_1$ and $SW_2$) for transmission over existing power wires running from an installed light switch to fixture 24. It should be noted that when these distinct AC signals are provided to lamp power terminal 26 of incandescent lamps or gas discharge lamp ballasts, these devices will continue to operate in a normal fashion. The inventors have determined that as long as the duration of the positive and negative going zero crossing step delays 104 and 106 each have a phase angle of less than 9 degrees, the energy lost due to the step will not have any appreciable effect on the operation or light output of lamp 18. This is due in part to the fact that very low energy is associated with an AC voltage waveform close to its zero crossing. Further, depending on the particular lamp 18 and power circuit 20, the inventors have found that this signalling technique generates low signal distortion.

Thus, switch encoder 12 is "transparent" to a load which consists of either an incandescent lamp or a ballast and gas discharge lamp. That is, the load will not notice the changes in input power waveform and will continue to operate normally regardless of whether the applied voltage signal is a normal full wave AC signal, or any of the encoded voltage waveforms $V_{23}$ shown in FIGS. 3a, 3b, 3c, 3d. However, the changes in waveform can be used for signalling and hence control, without creating any significant RF pollution and without being particularly susceptible to noise.

It should be noted that it is possible to effect "one-switch" dimming protocol which is common to European lighting applications, by replacing one switch (e.g. $SW_2$) and its associated circuitry (e.g. bilateral switch $Q_2$, thyristor $Q_7$, capacitors $C_6$ and $C_{10}$, and resistor $R_{10}$) with a simple diode configuration within decoder 12. Accordingly, encoded voltage waveform $V_{23}$ will be generated containing only small zero crossing step delays 100 and positive zero crossing step delays 104.

Figure 4:
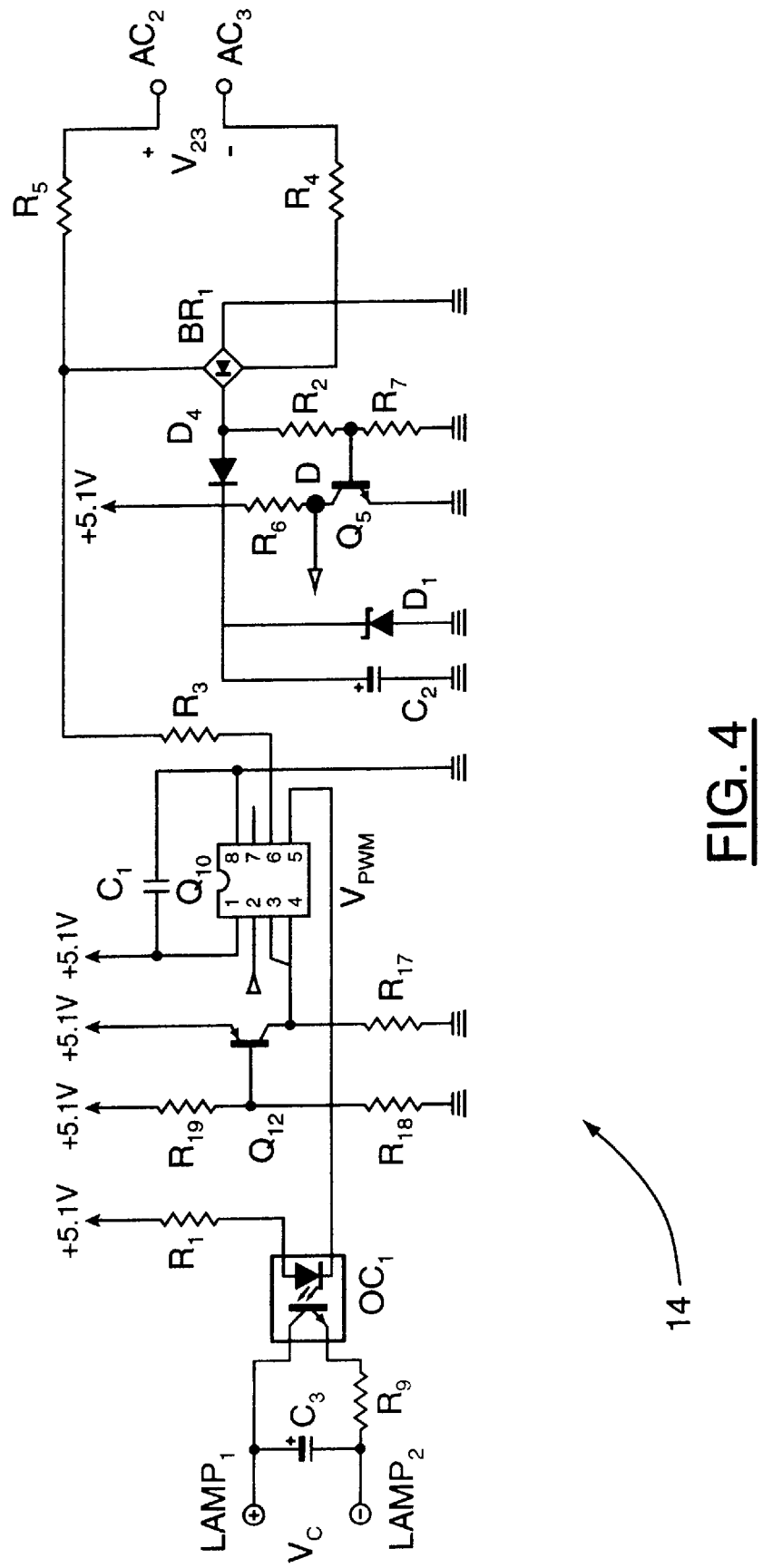
FIG. 4 is a schematic diagram of a decoder according to the present invention.

FIG. 4 is a schematic diagram of decoder 14. Decoder 14 includes a microcontroller $Q_{10}$, such as PIC 12c 509 manufactured by Microchip Technology Inc. of Chandler, Ariz., U.S.A., which can be readily programmed for various applications, as is well known. Further, decoder 14 also includes a bridge rectifier $BR_1$, transistors $Q_5$ and $Q_{12}$, optocoupler $OC_1$, zener diode $D_1$, diode $D_4$, capacitors $C_1$, $C_2$ and $C_3$, and resistors $R_1$, $R_2$, $R_3$, $R_4$, $R_5$, $R_6$, $R_7$, $R_9$, $R_{17}$, $R_{18}$, $R_{19}$. Decoder 14 receives encoded voltage signal $V_{23}$ across terminals $AC_2$ and $AC_3$ and outputs a dimming control voltage $V_c$ for a standardized 0 to 10 volt interface according to the appropriate dimming standard across terminals $LAMP_1$ and $LAMP_2$ to load controller 16 (not shown in FIG. 4). Specifically, inventors have found that the following component values provide desirable operation of decoder 14:

| Designation | Description (or Part No.) | Designation | Description (or Part No.) |
|---|---|---|---|
| $Q_5$ | 2N3904 | $R_3$ | 1 MΩ |
| $Q_{12}$ | 2N3906 | $R_4$ | 33 kΩ |
| $D_1$ | 5.1 volts | $R_5$ | 33 kΩ |
| $D_4$ | 1N4148 | $R_6$ | 100 kΩ |
| $C_1$ | 100 nF | $R_7$ | 10 kΩ |
| $C_2$ | 47 μF | $R_9$ | 2 kΩ |
| $C_3$ | 47 μF | $R_{17}$ | 10 kΩ |

-continued

| Designation | Description (or Part No.) | Designation | Description (or Part No.) |
| --- | --- | --- | --- |
| $R_1$ | 2 kΩ | $R_{18}$ | 51 kΩ |
| $R_2$ | 47 kΩ | $R_{19}$ | 10 kΩ |

The encoded voltage waveform $V_{23}$ across terminals $AC_2$ and $AC_3$ is applied to full wave bridge rectifier $BR_1$ through resistors $R_4$ and $R_5$ and is regulated by zener diode $D_1$ and filter capacitor $C_2$. Capacitor $C_2$ provides energy to decoder 14 and serves to regulate the supply voltage while the encoded voltage waveform $V_{23}$ is below the voltage on capacitor $C_2$. Diode $D_4$ shields this regulated voltage from appearing at its anode. As a result, the center point of the voltage divider formed by resistors $R_2$ and $R_7$ will not provide enough voltage at the base of transistor $Q_5$ and transistor $Q_5$ will not conduct. This will result in node D being pulled "high" through resistor $R_6$. Thus, while the absolute value of encoded voltage waveform $V_{23}$ is below a certain threshold voltage $V_T$, node D will remain "high". Once the absolute value rises above the threshold voltage $V_T$, transistor $Q_5$ will turn on and node D will be pulled "low" to ground. In this way a voltage pulse waveform $V_D$ is produced at node D having pulses with pulse widths that correspond to the time that encoded voltage waveform $V_{23}$ is less than threshold voltage $V_T$.

Microcontroller $Q_{10}$ has pin 1 connected to a positive supply voltage (e.g +5.1 volts) and pin 8 connected to ground and to power supply through capacitor $C_1$. Input pin 2 is connected to node D at the collector of transistor $Q_5$ such that voltage pulse waveform $V_D$ is provided to microcontroller $Q_{10}$. As discussed, voltage pulse waveform $V_D$ is high when the absolute value of encoded voltage waveform $V_{23}$ is below the threshold value $V_T$ and is low when encoded voltage waveform $V_{23}$ is above the threshold value $V_T$. Input pin 6 is connected to terminal $AC_2$ through resistor $R_3$ and the input signal at pin 6 is used by microcontroller $Q_{10}$ to distinguish between the positive and negative cycles of encoded voltage waveform $V_{23}$.

The threshold voltage $V_T$ is chosen so that it is lower than the absolute value of the encoded voltage waveform $V_{23}$ immediately after a positive or negative going zero crossing step delay 104 or 106 has occurred (e.g. threshold voltage $V_T$ is approximately 12 volts in the present example). Since the encoded voltage waveform $V_{23}$ rises in a rapid step-like manner following a zero crossing step delay 104 or 106, the time at which encoded voltage waveform $V_{23}$ exceeds the threshold voltage $V_T$ will be an accurate determination of the time at which the "step" of the zero crossing step delay 104 or 106 occurs.

Now referring to FIGS. 5a, 5b and 5c, the operating characteristics of microcontroller $Q_{10}$ which determine whether a positive or a negative going zero crossing step delay 104 and 106 has been encoded in encoded voltage waveform $V_{23}$ will be discussed. It should be understood that various methods of detecting positive or negative going zero crossing step delays 104 and 106 could be implemented by appropriately programming microcontroller $Q_{10}$, as would be conventionally known.

In a preferred method, however, Microcontroller $Q_{10}$ first determines whether a zero crossing step delay (i.e. either positive or negative going 104 or 106) is present in encoded voltage waveform $V_{23}$ by monitoring voltage pulse waveform $V_D$ at pin 2. If a zero crossing step delay 104 or 106 has been detected, microcontroller $Q_{10}$ determines from the input at pin 6 whether the encoded voltage waveform $V_{23}$ being input through resistors $R_5$ and $R_3$ at pin 6 is being detected during a positive or negative cycle using a known circuit configuration. Finally, microcontroller $Q_{10}$ is programmed so that output pin 5 provides a pulse width modulated (PWM) voltage signal $V_{PWM}$ having a pulse width that depends on the inputs received at pins 2 and 6, as will be described.

A sample encoded voltage waveform $V_{23}$ is shown in FIG. 5a and the corresponding voltage pulse waveform $V_D$ generated at node D of decoder 14 is shown in FIG. 5b. Microcontroller $Q_{10}$ has an internal clock speed of 4 MHz and is programmed to sample voltage pulse waveform $V_D$ every 8 microseconds. Microcontroller $Q_{10}$ is programmed to identify the falling edge of voltage pulse waveform $V_D$ as shown in the timing diagram of FIG. 5c. As shown, the time span between successive falling edges is determined (e.g. $t_0$, $t_0+x$, $t_0-x$, etc.) The inventors have determined that by calculating the time difference between the time spans between successive pairs of falling edges of voltage pulse waveform $V_D$, it is possible to accurately determine whether a zero crossing step delay (i.e. one of a positive or a negative going zero crossing step delay 104 or 106) has occurred. This determination can be accomplished in spite of frequency variations that commonly exist in AC power mains.

As an illustration, half cycles P, Q and S each have small zero crossing step delays 100 and half cycle R has a positive zero crossing step delay 104 (FIG. 5a). As previously described, voltage pulse waveform $V_D$ is generated such that the duration of each zero crossing step delay 100 or 104 is represented by the pulse width of the corresponding pulses T, U, V, and W (FIG. 5b). Specifically, the longer duration of positive going zero crossing step delay 104 is reflected in the longer pulse width of the pulse V. The time span between the falling edge of pulses T and U is $t_0$ (at X), the time span between the falling edge of pulses U and V is $(t_0+x)$ (at Y), and the time span between the falling edge of pulses V and W is $(t_0-x)$ (at Z) as shown in FIG. 5c. It should be noted that x is the difference between delays 100 and 104.

Accordingly, the absolute time difference between time spans Y and X is x and the time difference between time spans Z and Y is 2x. It should be understood that as long as switch $SW_1$ is depressed, positive going zero crossing step delays 104 will continue and the corresponding time difference between future time spans will remain at 2x due to the "lopsided" character of the full cycle of the resulting encoded voltage waveform $V_{23}$ (FIG. 5a). Correspondingly, if switch $SW_2$ is depressed and held, the time difference between the time spans between two successive pairs of falling edges will be x for one initial cycle and then remain at 2x. Further, if both switches $SW_1$ and $SW_2$ are depressed, both positive and negative going zero crossing step delays 104 and 106 will occur, and the time difference between time spans between successive pairs of falling edges will become approximately the same (i.e. there will be no difference between them) since the full cycle of the resulting encoded voltage waveform $V_{23}$ is now "balanced" (as it in the case where no step delays 104 or 106 are present).

In the example given, where delay 104 is 7 degrees and delay 100 is approximately 1 degree, then for a 60 Hz signal, x will be 0.27 milliseconds. This time difference x (or double this time difference 2x for future cycles where switch $SW_1$ continues to be depressed) is compared to a threshold duration (e.g. 40 microseconds). The threshold is selected so that detection accuracy can be maintained even in the presence of frequency variations that commonly exist in AC power mains. If the time difference is greater than the threshold duration then a zero crossing step delay (i.e. either positive or negative going 104 or 106) has been detected. If it is less than this threshold duration then the encoded voltage waveform $V_{23}$ consists of an unmodified AC waveform. If a zero crossing step delay has been detected then microcontroller $Q_{10}$ determines from the input at pin 6 whether the encoded voltage waveform $V_{23}$ being input through resistors $R_5$ and $R_3$ at pin 6 containing the zero crossing step delay was detected during a positive or negative cycle using a known circuit configuration.

If a positive going zero crossing step delay 104 (i.e. a zero crossing step delay in a positive cycle), then switch $SW_1$ must have been depressed (indicating that lighting intensity should be reduced) and accordingly, microcontroller $Q_{10}$ will decrease the pulse width of the PWM voltage waveform $V_{PWM}$ pulses at pin 5. If a negative going zero crossing step delay 106 (i.e. a zero crossing step delay in a negative cycle), then switch $SW_2$ must have been depressed (indicating that lighting intensity should be increased) and microcontroller $Q_{10}$ will increase the pulse width of the PWM voltage waveform $V_{PWM}$ pulses at pin 5. If either none or both step delays 104 and 106 are detected, microcontroller $Q_{10}$ will remain inactive.

Microcontroller $Q_{10}$ has been programmed such that when switch $SW_3$ of dimmer 10 is closed from an opened state, lamp 18 will receive maximum power. Subsequently, the operation of switches $SW_1$ and $SW_2$ will serve to dim and brighten lamp 18. However, it should be noted that by appropriately adapting and programming microcontroller $Q_{10}$, many different lighting control protocols may be implemented.

Referring back to FIG. 4, PWM voltage waveform $V_{PWM}$ from pin 5 of microcontroller $Q_1$ is applied to cathode of the LED of optocoupler $OC_1$ and the anode of the LED is connected to the power supply (e.g. +5.1 volts) through resistor $R_1$. It should be noted that optocoupler $OC_1$ is used to provide isolation between load controller 16 and the AC power line-fed decoder 14. As is conventionally known, when current flows through optocoupler $OC_1$, light is emitted by the LED and is received by the phototransistor detector. The amount of light received determines the amount of current allowed to pass from the collector to the emitter of the phototransistor detector. By decreasing (increasing) the pulse width of PWM voltage waveform $V_{PWM}$, the average current flow through resistor $R_9$ will be proportionally decreased (increased).

Thus, in conjunction with a standardized 0–10 volt interface acting as a voltage source, a proportional control voltage $V_C$ will be generated at terminals $LAMP_1$ and $LAMP_2$ which depends on the pulse width of PWM voltage waveform $V_{PWM}$. Any resulting ripple in control voltage $V_C$ is smoothed by filter capacitor $C_3$. It should be noted that microcontroller $Q_{10}$ changes the value of the output at pin 5 in accordance with the inputs at pins 2 and 6 at fixed intervals of time so that a user can effect dimming in discrete time intervals. It should be noted that the voltage generated across terminals $LAMP_1$ and $LAMP_2$ is between 0 and 10 volts in accordance with the well known 0–10 volt standard dimming protocol. As conventionally known, a number of dimming steps (e.g. 30) are provided within the 0 to 10 volt range, with each step having a fixed duration (e.g. 300 milliseconds).

"Brown-out" protection is provided by a commercially available sub-circuit comprising transistor $Q_{12}$ and resistors $R_{17}$, $R_{18}$ and $R_{19}$, manufactured by Microchip Technology Inc. This sub-circuit resets microcontroller $Q_{10}$ in the event of momentary drops in the power supply (provided at pin 1). If the voltage supply provided to the voltage divider comprising resistors $R_{18}$ and $R_{19}$ is at or below a certain operational level (as defined by the values of resistors $R_{18}$ and $R_{19}$), there will not be enough voltage at the center point of this voltage divider, and therefore not enough current to drive transistor $Q_{12}$. As a result, pin 4 of microcontroller $Q_{10}$ will be held low by resistor $R_{17}$ and consequently, microcontroller $Q_{10}$ will be reset. When the voltage supply is high enough for transistor $Q_{12}$ to conduct, pin 4 will be pulled "high" through transistor $Q_{12}$.

When both switches $SW_1$ and $SW_2$ are open (non-depressed) and switch $SW_3$ is first closed, the voltage waveform $V_{23}$ of FIG. 3a will be generated by switch encoder 12 and provided to terminals $AC_2$ and $AC_3$. As previously described, microcontroller $Q_{10}$ determines whether a zero crossing step delay (i.e. either positive or negative going 104 or 106) has been detected and if so whether it was detected in a positive or negative cycle of encoded voltage waveform $V_{23}$. Since the positive and negative cycles of encoded voltage waveform $V_{23}$ have only small zero crossing steps 100, microcontroller $Q_{10}$ will set the pulse width of PWM voltage waveform $V_{PWM}$ and the value of control voltage Vc initially to a maximum level. They will remain unchanged as long as neither switches $SW_1$ nor $SW_2$ are closed. Accordingly, load controller 16 will operate on the basis of the maximum control voltage $V_C$ and will maintain the running conditions of lamp 18 through power circuit 18 at this level indefinitely.

When switch $SW_1$ is closed (depressed), the positively encoded voltage waveform $V_{23}$ of FIG. 3b will be generated by switch encoder 12 and provided to terminals $AC_2$ and $AC_3$. It should be noted that when a user depresses switch $SW_1$, switch encoder 12 will produce this encoded voltage waveform $V_{23}$ within one full AC cycle, that is, before the user can physically release switch $SW_1$ to ensure operational reliability. Microcontroller $Q_{10}$ will determine the time difference between the time spans between successive pairs of falling edges and compare this time difference to the threshold duration, as previously discussed. Since the measured time difference will be longer than the threshold duration, microcontroller $Q_{10}$ will determine that a full zero crossing step delay 104 or 106 exists.

Based on the input received at pin 6, microcontroller $Q_{10}$ will then determine that a positive cycle is being detected and consequently that positive going zero crossing step delays 104 have been encoded. Accordingly, the pulse width of PWM voltage waveform $V_{PWM}$ pulses and the value of control voltage $V_C$ will be decreased and load controller 16 will alter the running conditions of lamp 18 through power circuit 18 to dim lamp 18. As previously described, if the user continues to depress switch $SW_1$, dimmer 10 will reduce the intensity of lamp 18 in gradual steps (e.g. three light intensity steps per second). By appropriately selecting the size of the steps and their frequency, the overall dimming characteristic can achieve a smoothed quality due to capacitor $C_3$.

When switch $SW_2$ is closed (depressed) and switch $SW_1$ is opened (non-depressed), the negatively encoded voltage waveform $V_{23}$ of FIG. 3c will be generated by switch encoder 12 and provided to terminals $AC_2$ and $AC_3$. Since encoded voltage waveform $V_{23}$ has zero crossing step delays 106, microcontroller $Q_{10}$ will determine the time difference between the time spans between successive pairs of falling edges and compare the time difference to the threshold duration. Since the measured time difference will be longer than the threshold duration, microcontroller $Q_{10}$ will determine that a full zero crossing step delay 104 or 106 exists.

Based on the input received at pin 6, microcontroller $Q_{10}$ will further determine that a negative cycle is being detected and consequently that negative going zero crossing step delays 106 have been encoded. Accordingly, the pulse width of PWM voltage waveform $V_{PWM}$ pulses and the value of control voltage $V_C$ will be increased and load controller 16 will alter the running conditions of lamp 18 through power circuit 20 to increase the intensity of lamp 18. As previously described, if the user continues to depress switch $SW_2$, dimmer 10 will increase the intensity of lamp 18 in gradual steps (e.g. every 2 or 3 seconds).

When both switches $SW_1$ and $SW_2$ are closed (depressed), dimming control 12 generates the positively and negatively encoded voltage waveform $V_{23}$ of FIG. 3d. Since both full "steps" 104, 106 are present, the time difference between the time spans between successive pairs of falling edges will be approximately the same and microcontroller $Q_{10}$ will remain inactive until one of the switches is released. In order to turn lamp 18 off, user must then open switch $SW_3$ so as to disconnect power to lamp 18.

As previously discussed, it is possible to effect a "one-switch" dimming protocol by eliminating one switch (e.g. $SW_2$) and its associated circuitry (e.g. bilateral switch $Q_2$, thyristor $Q_7$, capacitors $C_6$ and $C_{10}$, and resistor $R_{10}$) in decoder 12. Since an encoded voltage waveform $V_{23}$ will be generated containing small zero crossing step delays 100 and positive zero crossing step delays 104 only, microcontroller $Q_{10}$ of a corresponding decoder 14 will no longer be required to distinguish between the positive and negative cycles of encoded voltage waveform $V_{23}$ to determine when switch $SW_1$ has been pressed. According to the "one-switch" dimming protocol, load controller 16 would be instructed by microcontroller $Q_{10}$ to cycle through increased and decreased lighting intensity.

Figure 6A:
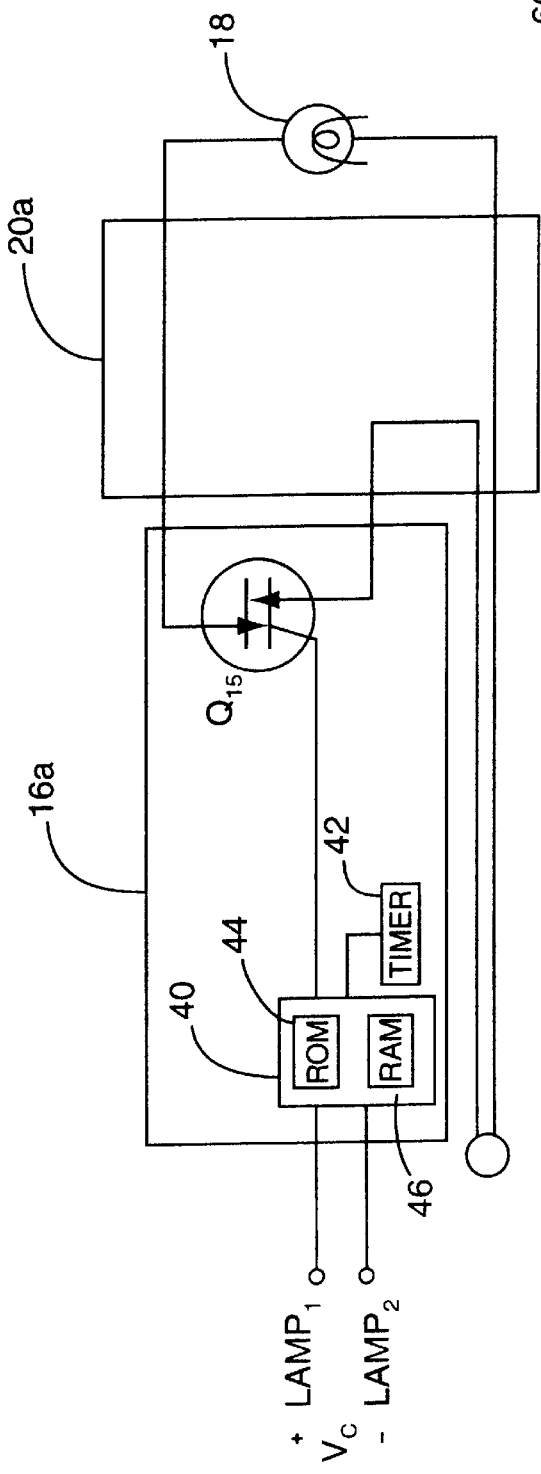
FIG. 6a is a block diagram of a typical load controller and power circuit for use with a typical incandescent lamp.

FIG. 6a shows an exemplary load controller 16a for use in association with an incandescent lamp 18 and power circuit 20. Load controller 16a comprises a microcontroller 40, timer circuit 42 and a triac $Q_{15}$. It should be noted that while a simple dimming method for incandescent lamps has been chosen for illustrative purposes, load controller 16a may be adapted to incorporate various other known incandescent dimming circuitry.

Microcontroller 40 may be any commercially available programmable device such as a Motorola 6800 microcontroller, although it should be understood that any type of logic circuit with similar operating functions can be utilized. Storage of program instructions and other static data is provided by a read only memory (ROM) 44, while storage of dynamic data is provided by a random access memory (RAM) 46. Both memory units 44 and 46 are controlled and accessed by microcontroller 40.

Timer 42 is a widely used Model 555 timer which utilizes an RC oscillator to produce a constant timing frequency signal. An applied reference signal produces a first polarity output. An opposite polarity output is produced at a time thereafter determined by an applied DC level.

Triac $Q_{15}$ is a conventionally bidirectional thyristor or a triac. It should be understood that triac $Q_{10}$ could be any other type of semiconductor switching element, such as a single thyristor or two thyristors arranged in anti-parallel configuration. Triac $Q_{15}$ is connected in series with lamp 18 to control the application of power from lamp power terminal 26 to lamp 18 in a known manner. When triac $Q_{15}$ is mostly conducting, a maximum amount of power (approximately 95%) is delivered to lamp 18. When triac $Q_{15}$ is mostly not conducting, a minimum amount of current (approximately 5%) flows through lamp 18. By controlling the period of conduction of triac $Q_{15}$, the current through lamp 18 can be varied between the dim and full lamp current values.

Power circuit 20a simply effects electrical connections between lamp power terminal 26 and triac $Q_{15}$ of load controller 16a and lamp 18, as shown.

Microcontroller 40 operates in accordance with the voltage present across terminals $LAMP_1$ and $LAMP_2$. Microcontroller 40 uses timer circuit 42 to generate a gate signal which, when applied to the gate of triac $Q_{15}$, will affect the time of firing (or the electrical conduction angle) of triac $Q_{15}$. By controlling the time of firing of the triac $Q_{15}$, microcontroller 40 can control the percentage of time lamp 18 is on, and thus the intensity of lamp brightness.

Microcontroller 40 is programmed to poll the voltage present across terminals $LAMP_1$ and $LAMP_2$, on a regular basis, such as (e.g.) every 0.1 seconds. Microcontroller 40 will generate a sharp pulse to time triac $Q_{15}$ after a certain time T after a zero crossing in accordance with the control voltage $V_C$ present across terminals $LAMP_1$ and $LAMP_2$. Current will flow through lamp 18 after time T and until the next zero crossing such that the average power delivered to lamp 18 can be controlled by varying time T. If microcontroller 40 detects an increased or decreased control voltage $V_c$, microcontroller 40 is programmed to appropriately increase or decrease, respectively time T at which microcontroller 40 will fire triac $Q_{15}$ in a step-wise manner. Microcontroller 40 will adjust time T until no further change is detected across terminals $LAMP_1$ and $LAMP_2$ or until a maximum or minimum brightness is reached. Each increment step has a duration of (e.g.) approximately 300 microseconds (e.g. for a standard 0–10 volt protocol) to allow the user sufficient time to select the appropriate brightness for lamp 18.

As long as both switches $SW_1$ and $SW_2$ are open, the voltage present across terminals $LAMP_1$ and $LAMP_2$ will remain constant at a particular control voltage $V_c$. Accordingly, microcontroller 40 will simply apply the appropriate frequency to the gate of triac $Q_{15}$. If switch $SW_1$ is depressed then microcontroller 40 will detect a decreased control voltage $V_c$ and will decrease the frequency of the gating signal accordingly. If switch $SW_2$ is depressed then microcontroller 40 will detect an increased control voltage $V_C$ across terminals $LAMP_1$ and $LAMP_2$ and increase the frequency of the gating signal accordingly.

Figure 6B:
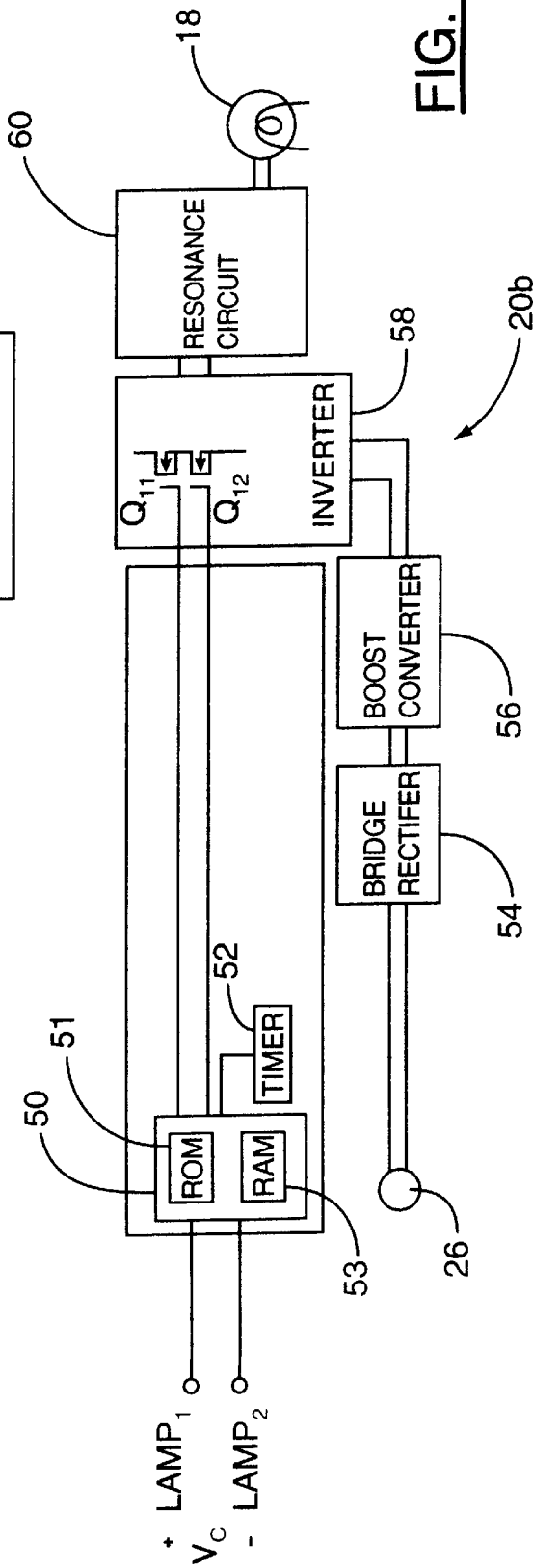
FIG. 6b is a block diagram of a typical load controller and power circuit for use with a typical gas discharge lamp ballast.

FIG. 6b shows an exemplary load control 16b adapted for use with a ballast-type gas discharge lamp 18. Load control 16b utilizes a microcontroller 50 and a timer 52 to change the operating oscillation frequency or duty cycle of the inverter signal of a typical electronic ballast. Microcontroller 50 is of similar specification to microcontroller 40 with ROM 51 and RAM 53. It should be noted that although the following discussion relates to the adaptation of a very simple and typical electronic ballast, it is possible to adapt the present invention within any type of lamp ballast by suitably controlling ballast power.

Power circuit 20b comprises a typical electronic ballast, as is well known, and includes a bridge rectifier 54, a boost converter 56, an inverter 58 and a resonance circuit 60. AC power from lamp power terminal 26 is passed through bridge rectifier 54 and into boost converter 56. Boost converter 56 provides a regulated voltage to inverter 58. Inverter 58 changes the DC voltage to AC voltage at high frequencies and includes transistors $Q_{f1}$ and $Q_{f2}$ at its output. The signal generated by transistors $Q_{f1}$ and $Q_{f2}$ is typically applied to resonance circuit 60. Resonance circuit 60 is directly coupled to lamp 18 and is commonly used to avoid the necessity of an output transformer. Dimming is typically achieved by varying the frequency of operation of inverter 58 by controlling the operation of transistors $Q_{f1}$ and $Q_{f2}$.

Microcontroller 50 and timer 52 are configured to form a voltage controlled oscillator which changes the oscillation frequency or duty cycle of ballast power, in response to the control voltage $V_C$ across terminals LAMP$_1$ and LAMP$_2$. Specifically, microcontroller 50 provides a variable square wave output to drive transistors $Q_{f1}$ and $Q_{f2}$ of inverter 58 to change the frequency of operation of inverter 58. By varying the frequency of the square wave output of microcontroller 50, the operational frequency of inverter 58 is suitably affected.

As previously described, microcontroller 50 regularly polls to check the control voltage $V_C$ present across terminals LAMP$_1$ and LAMP$_2$ and provide a control voltage to inverter 58 such that the running conditions of lamp 18 are adjusted to correspond with the level indicated by control voltage $V_C$.

Accordingly, dimmer 10 can be adapted for use with a variety of lamps including gas discharge, halogen and incandescent lamps, using an appropriate load controller 16a or 16b and an appropriate power circuit 20a or 20b.

Figure 7:
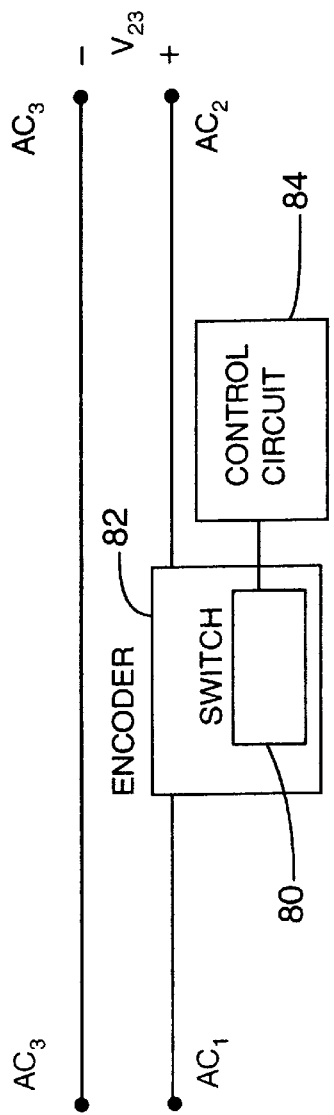
FIG. 7 is a block diagram of an alternate encoder circuit.

FIG. 2 may be depicted more generally in association with a control circuit 84 as shown in FIG. 7. Terminal AC$_1$ is connected to an encoder 82 such that an encoded voltage waveform $V_{23}$ is generated across terminals AC$_2$ and AC$_3$. Encoder 82 contains a switch 80 which is controlled by control circuit 84. In FIG. 2, encoder 82 is switch encoder 12 and switch 80 is comprised of switches SW$_1$, SW$_2$ and SW$_3$. Control circuit 84 may include a microcontroller or other automatic control apparatus for controlling the operation of switches SW$_1$, SW$_2$ and SW$_3$.

As described, positive going zero crossing step delays 104 as shown in FIG. 3b or negative going zero crossing step delays 106 as shown in FIG. 3c have been used for signalling and hence control, but as always, without significantly affecting the energy of the relevant half cycle of the AC power waveform. As discussed, while the AC supply voltage from the mains may fluctuate, such fluctuations will not affect the operation of dimmer 10 since they have little or no influence on the ability of microcontroller $Q_{10}$ to accurately detect the presence of zero crossing step delays 104, 106 which are used for signalling and control. In addition, the method described introduces insignificant harmonic distortion into the power waveform, and insubstantially affects the power factor since any such distortion due to the step characteristic occur in the vicinity of zero crossings of the AC power waveform and thus have relatively low power attributes. As mentioned, the method is transparent to the load, which treats each encoded voltage waveform $V_{23}$ as if it were an unmodified AC waveform.

It will be realized, however, that other methods can be used for signalling which have all or substantially all of the advantages of the system described above. Sequences such as that shown in FIGS. 8a and 8b can be generated by the circuit of FIG. 7, using an appropriate control circuit 84 having a suitably programmed microcontroller for controlling switches SW$_1$, SW$_2$ and SW$_3$ with high timing precision. As should be conventionally understood, there are many ways of encoding sequences which can represent, and be suitably decoded, as code words (e.g. simple binary code).

Figure 8A:
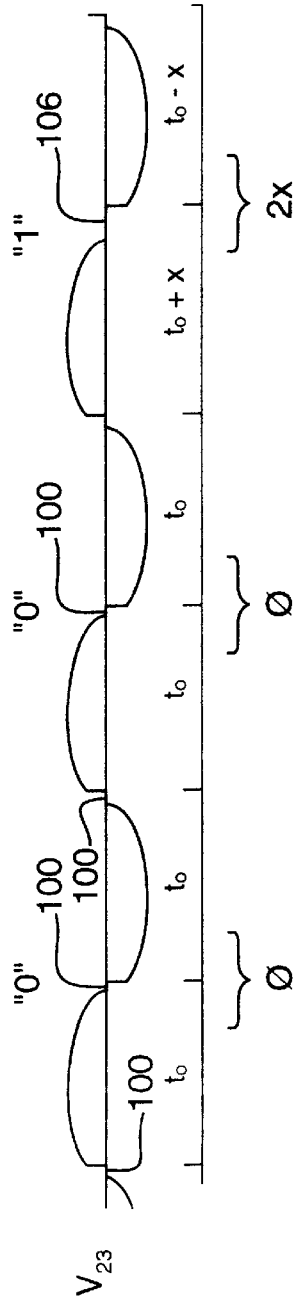
FIG. 8a is a diagram showing an encoded voltage waveform $V_{23}$ generated by the encoder of FIG. 7.

For example, as shown in FIG. 8a, the AC power waveform can be encoded to generate an encoded voltage waveform $V_{23}$ with a fixed number of full wave cycles (e.g. 1) with small zero crossing step delays 100 (the full cycle being representing a "zero") and a fixed number of full wave cycles (e.g. 1) with negative going zero crossing steps 106 (the full cycle representing a "one"). As discussed above, the steps of zero crossing valuation and detection of the falling edges of voltage pulse waveform $V_D$ could be performed in respect of the fixed number of full AC power waveform cycles (e.g within one full AC power waveform cycle in this example). Assuming that a full AC power waveform cycle starts with the zero crossing of the positive half-cycle, the time difference between time spans between successive pairs of falling edges within a full cycle can be used for decoding.

By evaluating whether there is a zero or non-zero time difference between the two successive pairs of falling edges within one full AC power waveform cycle, it is possible to determine whether a "zero" or a "one" has been transmitted. That is, if there is a non-zero time difference then a "one" has been transmitted and if there has been a zero time difference than a "zero" has been transmitted. Obviously, many other combinations of the different possible encoded waveforms $V_{23}$ could be utilized to generate an analogous code (e.g. using small zero crossing step delays 100 ("zero") with positive going zero crossing steps 106 ("one") and assuming a full AC power waveform cycle begins with a negative cycle, etc.)

Figure 8B:
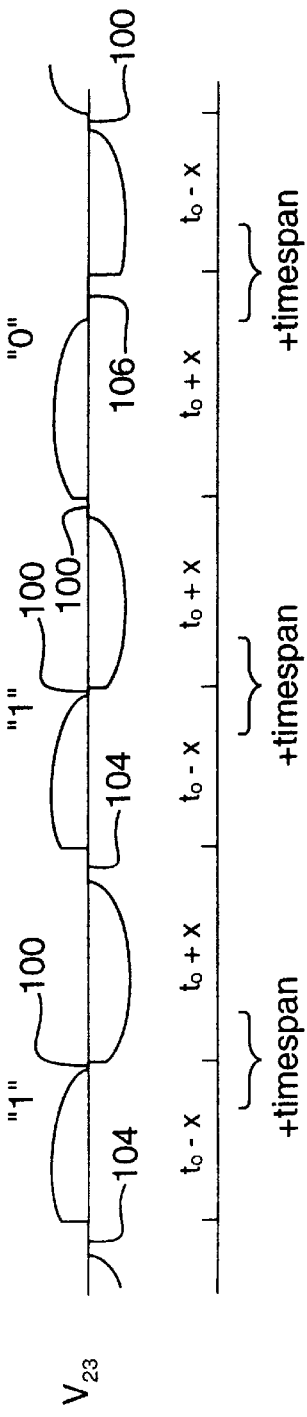
FIG. 8b is a diagram showing another encoded voltage waveform $V_{23}$ generated by the encoder of FIG. 7.

Another possible method of encoding an AC power waveform to generate a code would be to generate an encoded voltage waveform $V_{23}$ having a fixed number of full wave cycles (e.g. 1) which either contain positive going zero crossing steps 104 (which can be considered as a "one") or contain negative going zero crossing steps 106 (which can be considered as a "zero"), as shown in FIG. 8b. As discussed above, the steps of zero crossing valuation and detection of the falling edges of voltage pulse waveform $V_D$ could be performed on each fixed number of full wave cycles (e.g within one full AC power waveform cycle in this example). Assuming that a full AC power waveform cycle starts with the zero crossing of the positive half-cycle, the time difference between time spans between successive pairs of falling edges within the full cycle can be used for decoding.

If the time span between the first pair of falling edges is shorter than the time span between the second pair of falling edges (a "positive" time difference), then a positive going zero crossing step delay 104 has occurred to shorten the time lapse between the first pair of edges (i.e. a "one"). Similarly, if the time span between the first pair of falling edges is longer than the time span between the first pair of falling edges (a "negative" time span), then a negative going zero crossing step delay 106 has occurred to shorten the time lapse between the second pair of edges (i.e. a "zero").

To continue with these exemplary methods, FIGS. 8a and 8b waveforms can be decoded by any appropriate decoder that includes circuitry similar to that used by decoder 14 of FIG. 4. Microprocessor $Q_{10}$ would be additionally programmed to determine whether there is a zero or non-zero time difference or a positive or negative time difference between the time spans between successive pairs of falling edges of voltage pulse waveform $V_D$ (depending on the particular code protocol utilized) as described above and as would be apparent to someone skilled in the art. Further, such a decoder could be adapted to provide an appropriate control signal $V_C$ to the load controller 16 or to any other load controlled by the system.

Figure 9:
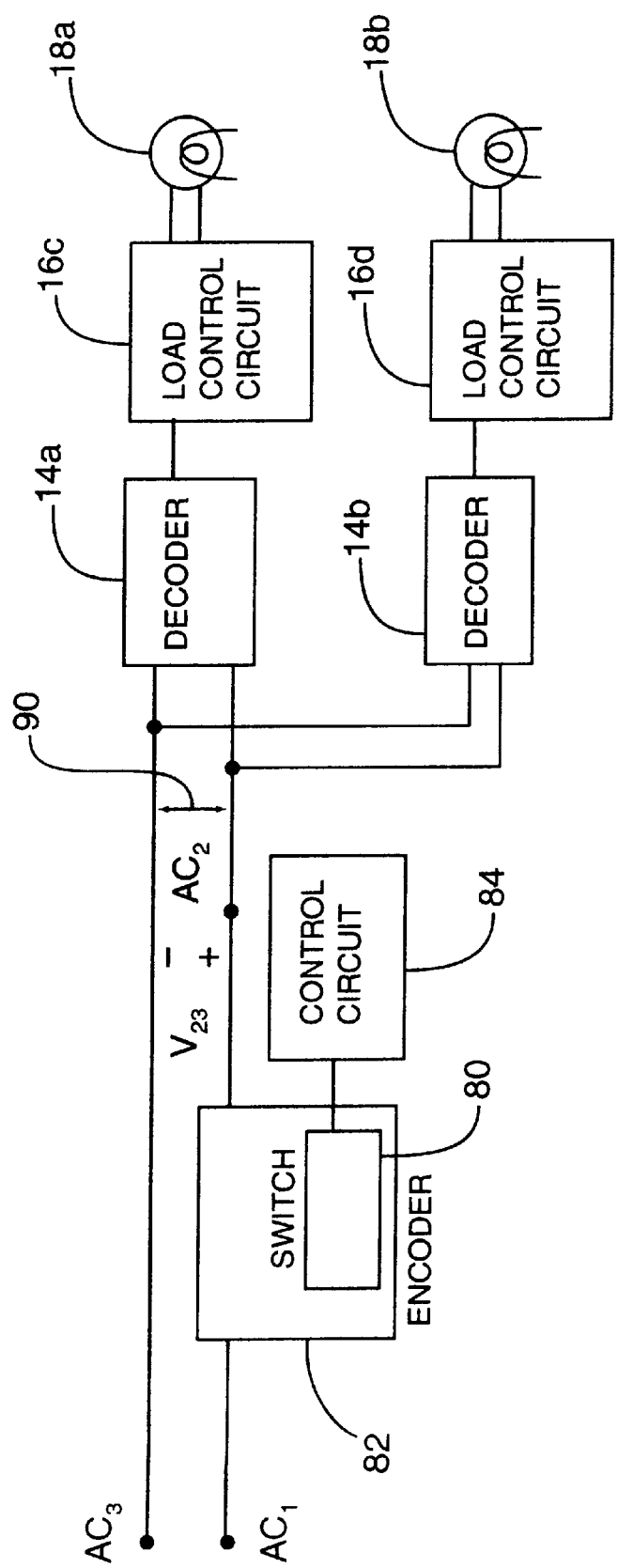
FIG. 9 is a block diagram showing a modification of the encoder circuit of FIG. 7 adapted for use with an alternate decoder circuit.

Moreover, if desired, a single encoder 82 can be used to control more than one lamp or electrical device as shown in FIG. 9. This can be accomplished by using a similar encoder 82 and control circuit 84 arrangement of FIG. 7 in association with two separate sets of decoders 14a, 14b, load control circuits 16c and 16d to independently control two loads 18a and 18b. Terminals $AC_2$, $AC_3$ are connected through a common set of wires 90 to two decoders 14a, 14b which in turn are connected to respective dimming interfaces or load control circuits 16c, 16d, which in turn are connected to lamps 18a, 18b.

Control circuit 84 can be programmed to cause encoder 82 to generate output waveform sequences of no crossing step delays and positive going step delays 104 to effect the code protocol illustrated in FIG. 8a or encoder 82 can be causes to generate output waveform sequences of positive and negative going zero crossing steps delays 104 and 106 to effect the protocol illustrated in FIG. 8b. These codes can contain addresses, as conventionally known, to direct certain control words to a particular lamp 18a or 18b. Specifically, control circuit 84 can cause encoder 82 to transmit a code for use by decoder 14a to control load control circuit 16c which controls lamp 18a. Similarly, control circuit 84 can cause encoder 82 to transmit a code for use by decoder 14b to control load control circuit 16d which controls lamp 18b.

In all cases, power for both loads is conducted along the common wires 90 and may be unmodified AC or may be the particular sequences of positive and negative going zero crossing steps delays 104 and 106 which are also used for control, as discussed above. Control circuit 84 could contain any appropriate user-friendly interface, e.g. two slide switches, or a single slide switch operated in one direction to operate lamp 18a and in the other direction to operate lamp 18b (if the loads are intended to operate only alternatively), with appropriate programming. Similarly, three or more loads can be powered and controlled along a common set of wires, by using sufficient selected sequences of small zero crossing step delays 100, positive or negative going zero crossing step delays 104 and 106 as codes, for control, and for power. In all cases, the energy of each half cycle will be substantially the same as for corresponding half cycles of the unmodified AC waveform.

It is of course important in all cases, and particularly in the circuit shown in FIG. 9, to ensure that the total harmonic distortion (in the transmitted AC waveform) does not exceed a selected limit, preferably 20% and more preferably 10%. In addition, the method used for signalling should not reduce the power factor of the transmitted waveform (at terminals $AC_2$, $A_3$) below 90% as compared with the power factor of the input waveform (at terminals $AC_2$, $AC_3$). Further, it is important that minimal high frequency components for signalling (e.g. minimal frequency components above about 100 kHz should have low power). However, desirably, each half cycle of the signal is used for signalling (e.g. positive or negative going zero crossing step delays 104 or 106 as shown in FIGS. 3b and 3c, or coded as shown in FIG. 8). This arrangement does not substantially affect the power factor, introduces substantial harmonic distortion, does not substantially change the energy of the power signal, does not require any additional wiring, and is relatively simple to use in practice.

In addition to providing dimming control for lighting ballasts and lamps, the present invention may also be used to control any type of conventional AC powered general household devices. Since dimmer 10 provides an AC signal, dimmer 10 can be directly employed with any AC devices. In this way, such household devices can be controlled by a device interface comprising any logic circuit which can differentiate between the signals described and which controls the device accordingly. Control of such devices may be achieved using a stand-alone computer or other remote control device connected to a wall outlet and does not require the installation of special switches or the running of separate communication wires to the device.

Finally, although the preferred embodiment has been described in connection with a two phase 60 Hz power line, the principle of the present invention can be applied to multiple-phase configurations, e.g. three phase configurations.

As will be apparent to persons skilled in the art, various modifications and adaptations of the structure described above are possible without departure from the present invention, the scope of which is defined in the appended claims.

We claim:

1. A dimmer circuit for controlling an electrical lighting device having a load input, said dimmer circuit including:
   (a) a power input terminal coupled to a first wire of an AC power line, said AC power line generating an input AC waveform across said first wire and a second wire, said input AC waveform having a selected waveform energy, said input AC waveform having a succession of zero crossings,
   (b) an encoding circuit coupled to said input terminal for selectively wave chopping the half cycles of said input AC waveform adjacent said zero crossings of input AC waveform to generate a plurality of output waveforms across an output terminal and said second wire, said output waveforms including said input AC waveform having at least some half cycle zero crossing step delays, each output waveform having a waveform energy substantially the same as said selected waveform energy,
   (c) a controller coupled to said encoding circuit and operative to cause said encoding circuit to produce across said output terminal and said second wire a selected one of said output waveforms,
   (d) said load input being adapted to be coupled to said output terminal and to said second wire for receiving said selected output waveform so that said selected output waveform provides operational power to said electrical lighting device, and
   (e) a decoder adapted to be coupled to said output terminal and to said second wire and to said electrical lighting device and responsive to the selected output waveform from said encoding circuit for controlling said electrical lighting device.

2. A dimmer circuit according to claim 1 wherein said output waveforms include said input AC waveform having at least some positive half cycle zero crossing step delays.

3. A dimmer circuit according to claim 1 wherein said output waveforms include said input AC waveform having at least some negative half cycle zero crossing step delays.

4. A dimmer circuit according to claim 1 wherein said output waveforms include said input AC waveform having at least some positive half cycle zero crossing step delays and at least some negative half cycle zero crossing step delays.

5. A dimmer circuit according to any of claims 1 to 4 wherein each said half cycle step delay begins immediately after a zero crossing of said input AC waveform.

6. A dimmer circuit according to claim 1 wherein the sequence of said half cycle zero crossing step delays in said output waveform comprises a code.

7. A dimmer circuit according to claim 1 wherein said output waveforms include said input AC waveform having a plurality of positive half cycle zero crossing step delays and a plurality of negative half cycle zero crossing step delays, the sequence of said positive and negative zero crossing step delays in said output waveform comprising a code.

8. A dimmer circuit according to claim 1 wherein the length of each of said half cycle zero crossing step delays has a phase angle equal to or less than 9 degrees.

9. A dimmer circuit according to claim 1 wherein each of said output waveforms has total harmonic distortion of less than or equal to 20%.

10. A dimmer circuit according to claim 1 wherein the power factor of each of said output waveforms differs from the power factor of said input AC waveform by less than 10%.

11. A dimmer circuit according to claim 1 wherein said encoding circuit includes at least one controlled rectifier configured within said encoding circuit so as to provide a full half cycle of said input AC waveform when conducting and to chop said half cycle of said input AC waveform when non-conducting.

12. A dimmer circuit according to claim 11 wherein said encoding circuit includes a first controlled rectifier being forward connected so as to provide the full positive half cycle of said input AC waveform when conducting and to chop said positive half cycle of said input AC waveform when non-conducting and a second controlled rectifier being reverse connected so as to provide the full negative half cycle of said input AC waveform when conducting and to chop said negative half cycle of said input AC waveform when non-conducting.

13. A dimmer circuit according to claim 12 wherein said encoding circuit includes a triggering circuit responsive to said controller for selectively delaying the turn-on said first controlled rectifier so as to produce a first output waveform comprising said input AC waveform having positive half cycle zero crossing step delays and the turn-on of said second controlled rectifier to produce a second output waveform comprising said input AC waveform having negative half cycle zero crossing step delays.

14. A dimmer circuit according to claim 13 wherein said controller comprises at least one manually operated switch coupled to said encoding circuit for controlling said triggering circuit so that said first wire of AC power line is normally connected to said power output through conducting said first and second controlled rectifiers, and for momentarily delaying the turn-on of at least one of said first and second controlled rectifiers so as to selectively produce said first and second waveforms.

15. A dimmer circuit according to claim 14 wherein said controller includes a microcontroller coupled to said encoding circuit for controlling the sequence of the positive and negative half cycle zero crossing step delays of the output waveform produced across said power output terminal and said second wire.

16. A dimmer circuit according to claim 1 wherein said output waveforms include said input AC waveform having small zero crossing step delays.

17. A dimmer circuit according to claim 16 wherein said decoder includes a zero crossing detection circuit for generating a voltage pulse waveform having pulses with pulse widths corresponding to the duration of any small zero crossing step delays, positive half cycle zero crossing step delays, and negative half cycle crossing step delays present in output waveform.

18. A dimmer circuit according to claim 17 wherein said decoder further includes an edge detector for detecting the falling edge of the pulses of said voltage pulse waveform.

19. A dimmer circuit according to claim 18 wherein said decoder further includes a processor for calculating the time difference between the time spans between successive pairs of said falling edges and determining whether the time difference is longer than a threshold length of time.

20. A dimmer circuit according to claim 19 wherein said decoder further includes a phase detector for determining whether a falling edge was present within one of a positive half cycle and a negative half cycle.

21. A dimmer circuit according to claim 1 wherein said load control circuit includes a lead for applying power to said electrical lighting device.

22. A dimmer circuit according to claim 1 wherein said electrical lighting device is connected across said output terminal and said second wire and includes a further control circuit connected to said load control circuit and responsive to the operation thereof for controlling said electrical lighting device.

23. A method of controlling an electrical lighting device at a first location connected to an AC power line at a second location, said AC power line having first and second wires and providing an AC waveform across said first and second wires, said AC waveform having a selected waveform energy and a succession of zero crossings, said method including the steps of:

(a) selectively wave chopping the half cycles of said input AC waveform adjacent said zero crossings to generate a plurality of output waveforms across an output terminal and said second wire, said output waveforms including said AC waveform having at least some half cycle zero crossing step delays, (b) selectively transmitting one of said output waveforms from said second location across said first and second wires to said electrical lighting device, to provide operational power to said electrical lighting device, (c) decoding said power waveforms at said first location, and controlling said electrical lighting device in accordance therewith.

24. A method according to claim 23 wherein step (a) further comprises the steps of selectively wave chopping positive half cycles of said input AC waveform adjacent said zero crossings to produce a first output waveform consisting of the AC waveform with positive half cycle zero crossing step delays and selectively wave chopping negative half cycles of said input AC waveform adjacent said zero crossings of said input AC waveform to produce a second output waveform consisting of the AC waveform with negative half cycle zero crossing step delays.

25. A method according to claim 23 wherein said output waveforms include said input AC waveform with small half-cycle zero crossing step delays.

26. A method according to claim 25 wherein the step of decoding further comprises the steps of:

(d) generating a voltage pulse waveform having pulses with pulse widths corresponding to the duration of any said small zero crossing step delays, said positive half cycle zero crossing step delays, and said negative half cycle crossing step delays present in output waveform, (e) detecting the falling edge of the pulses of said voltage pulse waveform, calculating the time difference between the time spans between successive pairs of said falling edges, and (f) determining whether said time difference is longer than a threshold length of time.

27. A method according to claim 26 wherein the step of decoding further comprises the step of determining whether a falling edge was present within one of a positive half cycle and a negative half cycle.

28. A method according to claim 24, including using said first and second output waveforms to increase and decrease the brightness of said electrical lighting device.

\* \* \* \* \*